United States Patent
Sun et al.

(10) Patent No.: US 12,034,246 B2
(45) Date of Patent: Jul. 9, 2024

(54) ELECTRICAL CONNECTOR, ELECTRICAL CONNECTOR ASSEMBLY AND ELECTRICAL EQUIPMENT

(71) Applicant: Tyco Electronics (Shanghai) Co. Ltd., Shanghai (CN)

(72) Inventors: Zhengguo Sun, Shanghai (CN); Guangming Zhao, Shanghai (CN); Jie Luo, Foshan (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 345 days.

(21) Appl. No.: 16/691,848

(22) Filed: Nov. 22, 2019

(65) Prior Publication Data

US 2020/0169029 A1  May 28, 2020

(30) Foreign Application Priority Data

Nov. 23, 2018  (CN) .......................... 201811412661.X

(51) Int. Cl.
| | | |
|---|---|---|
| *H01R 13/11* | (2006.01) | |
| *H01R 12/72* | (2011.01) | |
| *H01R 13/506* | (2006.01) | |
| *H01R 25/14* | (2006.01) | |
| *H02G 5/06* | (2006.01) | |

(52) U.S. Cl.
CPC ......... *H01R 13/506* (2013.01); *H01R 12/727* (2013.01); *H01R 13/113* (2013.01); *H01R 25/142* (2013.01); *H02G 5/06* (2013.01)

(58) Field of Classification Search
CPC .. H05K 7/1492; H05K 7/1457; H05K 7/1489; H05K 7/1491; H05K 7/186; H01R 41/00; H01R 25/14; H01R 12/7088; H01R 13/113; H01R 13/187; H01R 13/6315
See application file for complete search history.

(56) References Cited

U.S. PATENT DOCUMENTS

| | | | | |
|---|---|---|---|---|
| 4,684,191 A | * | 8/1987 | Feher ................... | H01R 25/142 439/246 |
| 5,013,265 A | * | 5/1991 | Buchter ............... | H01R 25/162 439/744 |
| 6,089,929 A | * | 7/2000 | Sloey ................... | H01R 13/187 439/845 |
| 6,205,029 B1 | * | 3/2001 | Byrne ................... | H05K 7/1457 174/68.2 |
| 6,445,571 B1 | * | 9/2002 | Inniss ...................... | H02B 1/20 174/68.2 |
| 7,142,411 B2 | * | 11/2006 | McLeod ................. | G06F 1/183 361/624 |
| 7,581,972 B2 | * | 9/2009 | Daamen ............. | H01R 13/6315 439/249 |
| 8,118,606 B2 | * | 2/2012 | Larsson ............... | H01R 25/142 439/110 |
| 8,351,192 B2 | * | 1/2013 | Archibald ............ | H05K 7/1492 361/679.02 |

(Continued)

*Primary Examiner* — Felix O Figueroa
(74) *Attorney, Agent, or Firm* — Barley Snyder

(57) ABSTRACT

An electrical connector includes a support bracket and a connection terminal. The connection terminal includes a terminal body mounted on the support bracket and in sliding electrical contact with a bus bar extending in a first plane, and a terminal connection portion protruding from a bottom of the terminal body in a first direction parallel to the first plane and electrically connected to a circuit board.

15 Claims, 12 Drawing Sheets

(56) References Cited

U.S. PATENT DOCUMENTS

| | | | |
|---|---|---|---|
| 8,388,389 B2* | 3/2013 | Costello | H01R 13/18 |
| | | | 439/839 |
| 9,331,409 B2* | 5/2016 | Naganuma | H01R 12/7047 |
| 9,379,503 B2* | 6/2016 | Bonzi | H01R 4/48 |
| 9,450,358 B2* | 9/2016 | Ehlen | H01R 25/14 |
| 9,680,236 B2* | 6/2017 | Ngo | H01R 12/724 |
| 9,693,477 B1 | 6/2017 | Ehlen | |
| 9,871,309 B2* | 1/2018 | Gao | H01R 13/11 |
| 9,985,403 B1 | 5/2018 | Herring et al. | |
| 10,015,903 B1 | 7/2018 | Ehlen | |
| 10,522,945 B2* | 12/2019 | Schneider | H01R 13/112 |
| 10,665,963 B2* | 5/2020 | Huang | H01R 13/6461 |
| 10,673,189 B2* | 6/2020 | Mulfinger | H05K 7/1457 |
| 10,756,500 B2* | 8/2020 | Herring | H01R 12/7088 |
| 10,939,576 B2* | 3/2021 | Horning | H01R 13/113 |
| 11,177,599 B2* | 11/2021 | Horning | H01R 13/426 |
| 2020/0127402 A1* | 4/2020 | Sabo | H01R 12/7005 |
| 2020/0127403 A1* | 4/2020 | Sabo | H01R 13/2442 |
| 2020/0243997 A1* | 7/2020 | Horning | H05K 7/1492 |
| 2020/0244050 A1* | 7/2020 | Corban | H01R 13/113 |

* cited by examiner

ELECTRICAL CONNECTOR, ELECTRICAL CONNECTOR ASSEMBLY AND ELECTRICAL EQUIPMENT

CROSS-REFERENCE TO RELATED APPLICATION

This application claims the benefit of the filing date under 35 U.S.C. § 119(a)-(d) of Chinese Patent Application No. 201811412661.X, filed on Nov. 23, 2018.

FIELD OF THE INVENTION

The present invention relates to an electrical connector and, more particularly, to an electrical connector adapted to supply power to a circuit board.

BACKGROUND

Electrical equipment can include a cabinet in which a drawer is held, and the drawer may be drawn out in a sliding manner for service, testing, and the like of an electrical component mounted in the drawer. Typically, the electrical component is powered by power wires connected to its circuit board. However, in some applications, it may be desirable to maintain the electrical component in the drawer in a powered state during service, testing and the like, and thus the power wires need to be extended with the drawer, thereby requiring the power wires to be long enough to conform to movement of the drawer.

SUMMARY

An electrical connector includes a support bracket and a connection terminal. The connection terminal includes a terminal body mounted on the support bracket and in sliding electrical contact with a bus bar extending in a first plane, and a terminal connection portion protruding from a bottom of the terminal body in a first direction parallel to the first plane and electrically connected to a circuit board.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
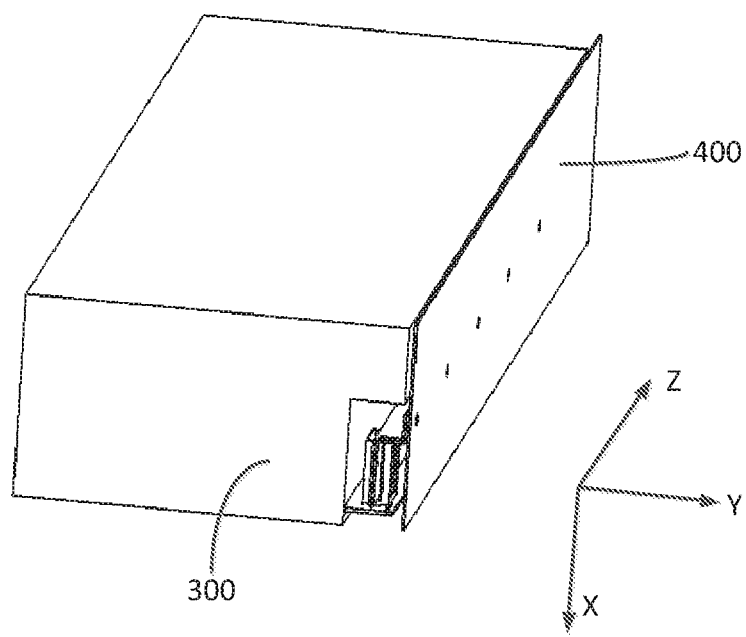
FIG. 1 is a perspective view of an electrical equipment according to an embodiment.

The present disclosure will be described in further detail with reference to the following embodiments, taken in conjunction with the accompanying drawings. In the specification, the same or similar references indicate the same or similar components. The following description of embodiments of the present disclosure with reference to the accompanying drawings is intended to explain the general inventive concept of the present disclosure and should not be construed as limiting the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
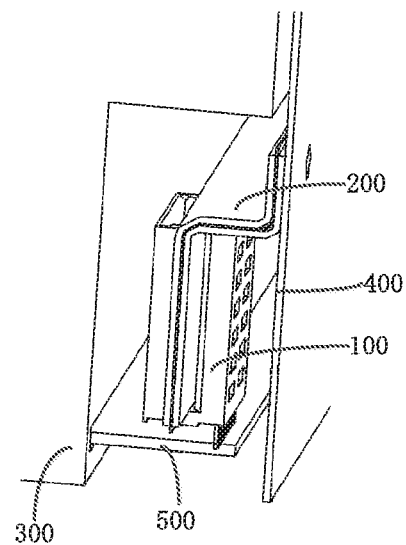
FIG. 2 is an enlarged view of a portion of FIG. 1.
Figure 3:
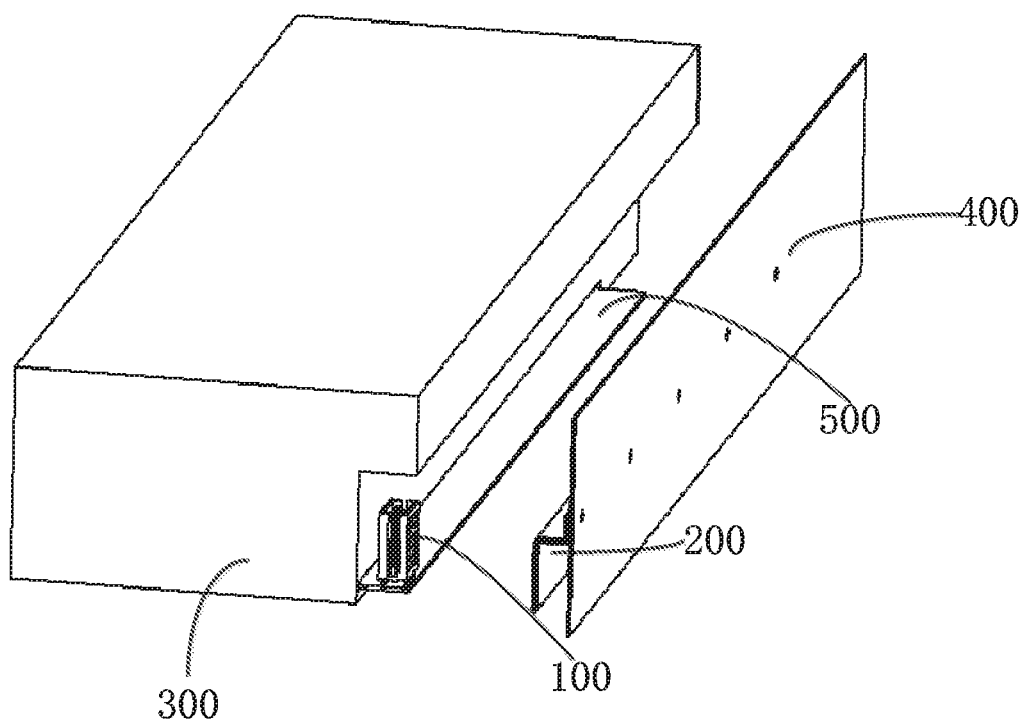
FIG. 3 is an exploded perspective view of the electrical equipment of FIG. 1.

As shown in FIGS. 1-3, an electrical equipment according to an embodiment comprises a cabinet 400 and a drawer 300 which is moveably held in the cabinet 400 in a reciprocal manner. The drawer 300 may be drawn out of the cabinet 400 for service, testing and the like of an electrical component mounted in the drawer 300. A bus bar 200 is mounted on an inner sidewall of the cabinet 400, and an electrical connector 100 is mounted on a mounting sidewall 301 of the drawer 300 facing the inner sidewall of the cabinet 400 on which the bus bar 200 is mounted. The electrical connector 100 is electrically connected to the bus bar 200 and also electrically connected to a circuit board 500 held in the drawer 300, thereby supplying power or transmitting electrical signals to circuits disposed in the circuit board 500 in the drawer 300 by the bus bar 200 connected to external power wires.

Figure 4:
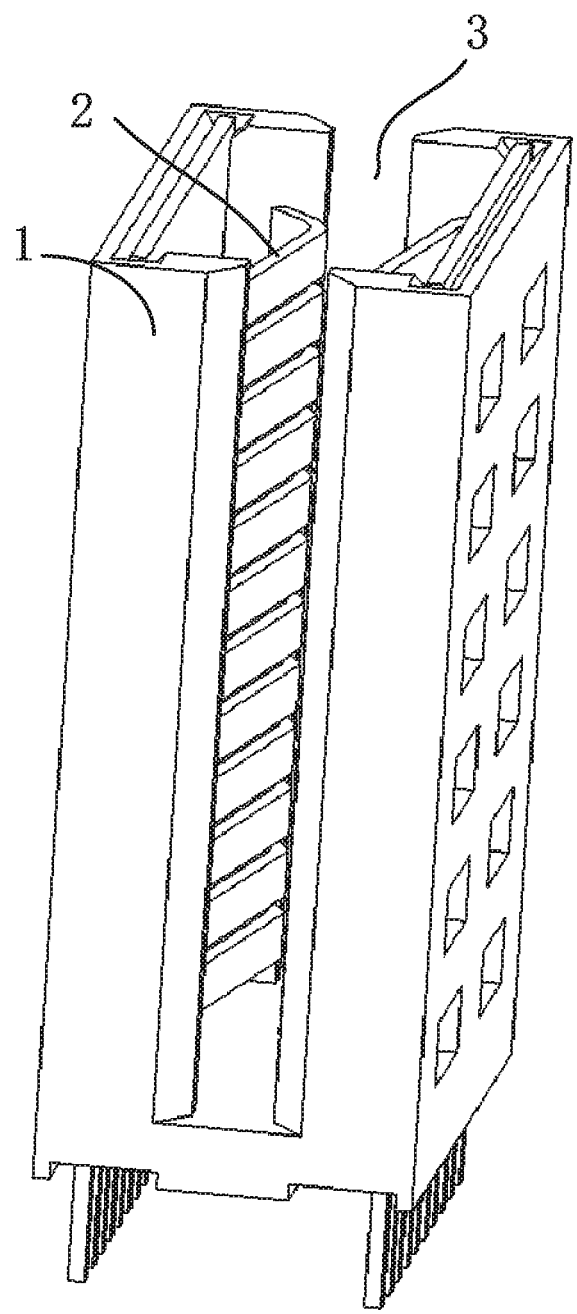
FIG. 4 is a perspective view of an electrical connector according to an embodiment.

The electrical connector 100, as shown in FIG. 4, includes a support bracket 1 and a plurality of connection terminals 2. In an embodiment, the support bracket 1 is made of a plastic material and the connection terminals 2 are made of a copper or a stainless steel material. In the shown embodiment, the connector 100 has two connection terminals 2, but the number of connection terminals 2 may vary in other embodiments.

In the electrical connector 100, as shown in FIGS. 2-7, each of the connection terminals 2 has a terminal body 21 and at least one terminal connection portion 22. The terminal body 21 is mounted in the support bracket 1 and is configured to be kept in sliding electrical contact with the bus bar 200 extending in a first plane. The terminal connection portion 22 protrudes from a bottom of the terminal body 21 in a first direction X parallel to the first plane so as to be electrically connected to the circuit board 500.

The support bracket 1 is mounted on the mounting sidewall 301 of the drawer 300 which is adapted to hold the circuit board 500 and held in the cabinet 400. During drawing the drawer 300 from the cabinet 400, the support bracket 1 and the connection terminals 2 mounted in the support bracket 1 may slide relative to the bus bar 200 mounted on the inner sidewall of the cabinet 400 and extending in the first plane, and the connection terminals 2 are always kept in electrical contact with the bus bar 200 to supply power or transmit electrical signals by the bus bar 200 to the circuits disposed in the circuit board 500 in the drawer 300. In this way, it is possible to maintain the supply of electrical power to the electrical component during the operations of service, testing and the like of the electrical components in the drawer 300.

Figure 5:
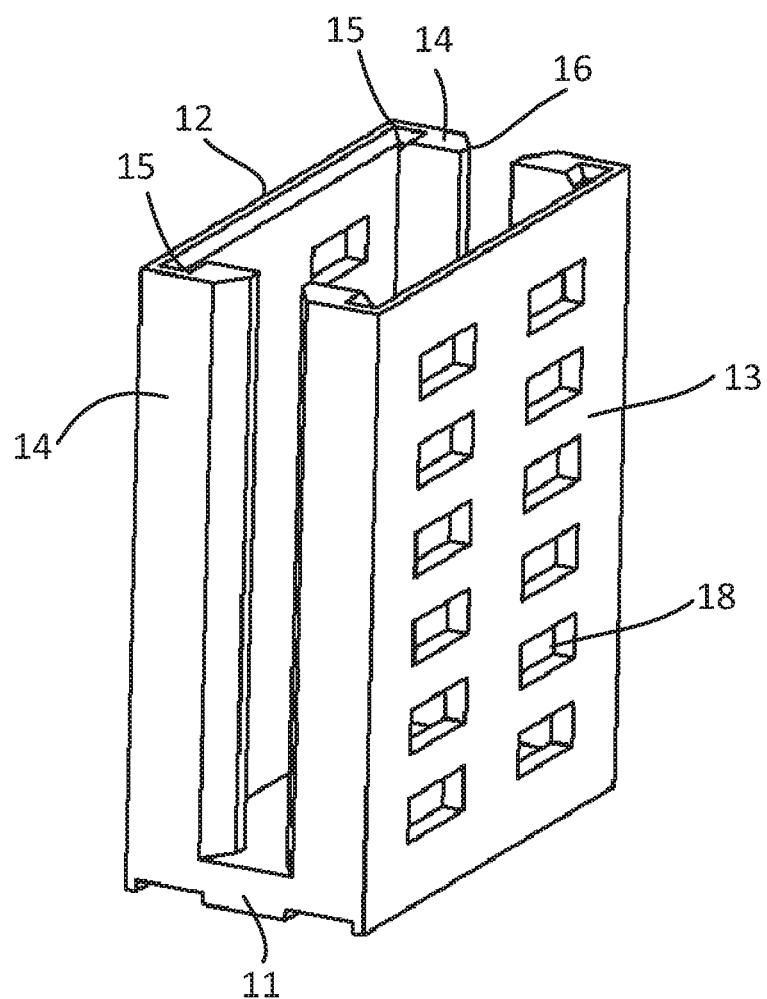
FIG. 5 is a perspective view of a support bracket of an electrical connector.

The support bracket 1, as shown in FIGS. 4 and 5, includes a plate-shaped bottom wall 11 having a through hole extending in the first direction X, through which the terminal connection portion 22 protrudes from a first side (a bottom side in the shown embodiment) of the bottom wall 11. The support bracket 1 has a first sidewall 12 extending upwardly from the bottom wall 11 in a direction perpendicular to the bottom wall 11. The first sidewall 12 has a mounting portion, which is adapted to mount the terminal body 21, on a first side of the first sidewall 12. The support bracket 1 has a second sidewall 13 extending upwardly from the bottom wall 11 in the direction perpendicular to the bottom wall 11, and the second sidewall 13 is provided with a mounting portion, which is adapted to mount a terminal body 21 of another connection terminal 2, on a first side of the second sidewall 13. The mounting portion of the first sidewall 12 and the mounting portion of the second sidewall 13 are disposed face to face. In this way, a sliding channel 3 having a certain width in a second direction Y perpendicular to the first plane is formed between the mounting portion of the first sidewall 12 and the mounting portion of the second sidewall 13, so that at least a portion of the bus bar 200 slides through the sliding channel 3 in a third direction Z perpendicular to both the first direction X and the second direction Y. In this way, the support bracket 1 and the connection terminals 2 thereon may slide relative to the bus bar 200 and the terminal bodies 21 of the connection terminals 2 may always be kept in sliding electrical contact with the bus bar 200 during drawing the drawer 300 from the cabinet 400 in the third direction Z.

The first sidewall 12 and the second sidewall 13 extend upward from the bottom wall 11 in the direction perpendicular to the bottom wall 11 in the shown embodiment, but in other embodiments, only one of the first sidewall 12 or the second sidewall 13 may be provided as appropriate.

The support bracket 1, as shown in FIGS. 4 and 5, has two pairs of third sidewalls 14, one of the two pairs of third sidewalls 14 extending from two opposite sides of the first sidewall 12 in the second direction Y, the other one of the two pairs of third sidewalls 14 extending from two opposite sides of the second sidewall 13 in the second direction Y. The one of the two pairs of third sidewalls 14 is opposite to the other one of the two pairs of third sidewalls 14 to form a sliding channel 3 between the mounting portion of the first sidewall 12 and the mounting portion of the second sidewall 13, so that at least a portion of the bus bar 200 slides through the sliding channel 3 in the third direction Z. As a result, a cross-section of each of the first and second sidewalls 12, 13 in a plane parallel to both the second and third directions Y, Z are of U-shaped structure to accommodate at least a portion of the connection terminals 2. At least a portion of the connection terminals 2 is positioned in the sliding channel 3 when the bus bar 200 does not enter the sliding channel 3 between the mounting portion of the first sidewall 12 and the mounting portion of the second sidewall 13, so that the connection terminals may resiliently abut against two opposite side surfaces and be kept in sliding electrical contact with the bus bar 200 when the bus bar 200 enters the sliding channel 3 and slides along the sliding channel 3.

As shown in FIG. 5, each of each pair of third sidewalls 14 has a guide portion 16 on a side away from the other one of the pair of third sidewalls 14, and the bus bar 200 may be easily inserted into the sliding channel 3 through the guide portion 16.

Figure 6:
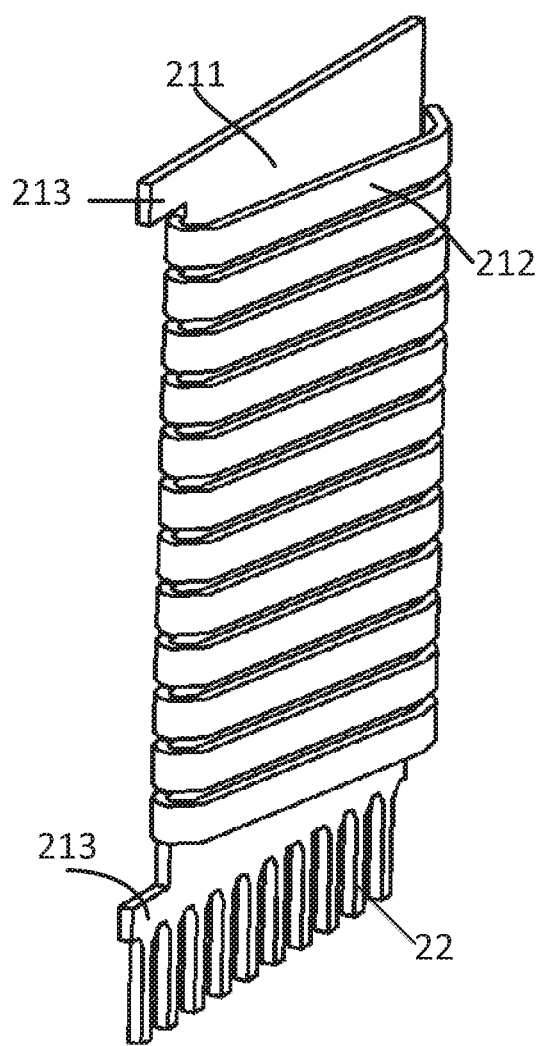
FIG. 6 is a front perspective view of an electrical terminal of an electrical connector.
Figure 7:
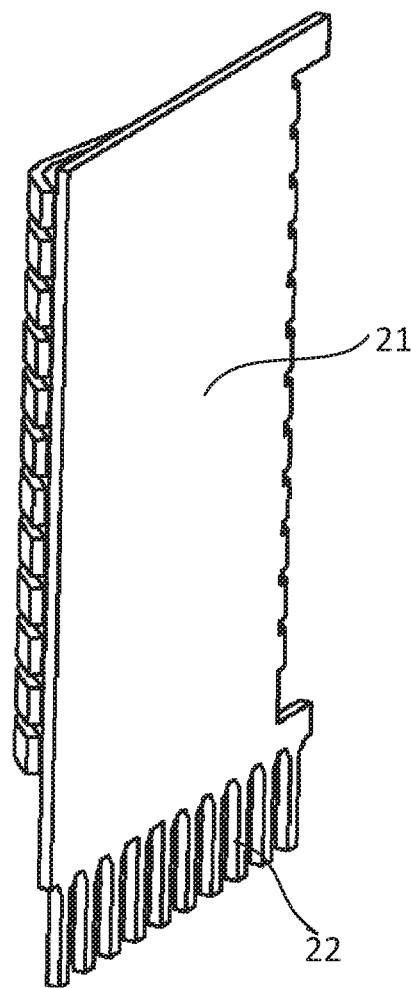
FIG. 7 is a rear perspective view of the electrical terminal of FIG. 6.

As shown in FIGS. 4, 6 and 7, in an embodiment, each terminal body 21 has a base 211 extending in a plane parallel to the first plane and mounted at the mounting portion, and a contact portion 212 bent from at least one of two opposite sides of the base 211 to a surface of the base 211 and adapted to be in electric contact with the bus bar 200. In this way, the contact portion 212 is in electrical contact with the bus bar 200, so that power may be supplied to the circuit board 500 via the connection terminal 2 from the bus bar 200.

Figure 15:
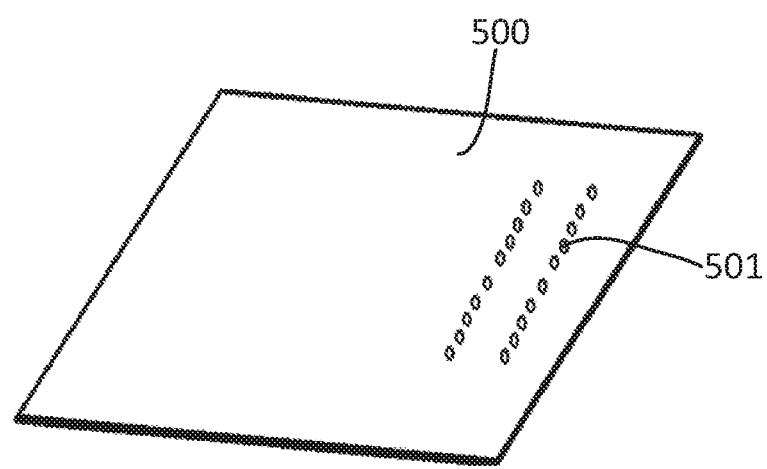
FIG. 15 is a perspective view of a circuit board according to an embodiment.

The terminal connection portion 22, as shown in FIG. 4, has an insertion portion extending from the bottom of the base 21 and inserted into a terminal insertion hole 501 in the circuit board 500, shown in FIG. 15, and a free end of the terminal connection portion 22 of the connection terminal 2 is inserted into the terminal insertion hole 501 of the circuit board 500, thereby achieving the electrical connection between the connection terminal 2 and the circuit board 500. In other embodiments, the terminal connection portion 22 may have a connection surface extending from the bottom of the terminal body 21 and adapted to be in electrical contact with an electrical contact of the circuit board 500 at the free end thereof, and the connection terminal 2 may be electrically connected to the circuit board 500 by soldering or the like.

In an embodiment, the contact portions 212 of the two connection terminals 2 elastically abut against the two opposite sides of the bus bar 200, respectively, to ensure that the contact portions 212 of the two connection terminals 2 may elastically abut against the two opposite sides of the bus bar 200 and be kept in reliably sliding electrical contact with the bus bar 200 when the bus bar 200 slides along the sliding passage 3.

As shown in FIGS. 6 and 7, the contact portion 212 has a plurality of elastic pieces spaced apart from each other, each of which has an arc-shaped structure protruding toward the bus bar 200 on the surface of the base 211 to ensure that the bus bar 200 smoothly slides within the sliding channel 3 of the support bracket 1 and maintains the sliding electrical contact with the connection terminal 2.

As shown in FIGS. 4 and 5, each pair of third sidewalls 14 has engaging grooves 15, and the two opposite sides of the base 211 of each connection terminal 2 are at least partially inserted into the engaging grooves 15, thereby achieving connection of the connection terminal 2 to the support bracket 1. In another embodiment, the support bracket 1 may be also directly over-molded on the connection terminal 2 by using an injection molding process.

As shown in FIGS. 5 and 6, upper and lower portions of one side of the base 211 of the connection terminal 2 have protrusions 213 protruding outward from a plane in which the base 211 is positioned, respectively. The protrusions 213 may be inserted into the engaging groove 15 of each pair of third sidewalls 14, and the other side of the base 211 of the connection terminal 2 may be inserted into the other engaging groove 15 of each pair of third sidewalls 14.

Figure 8:
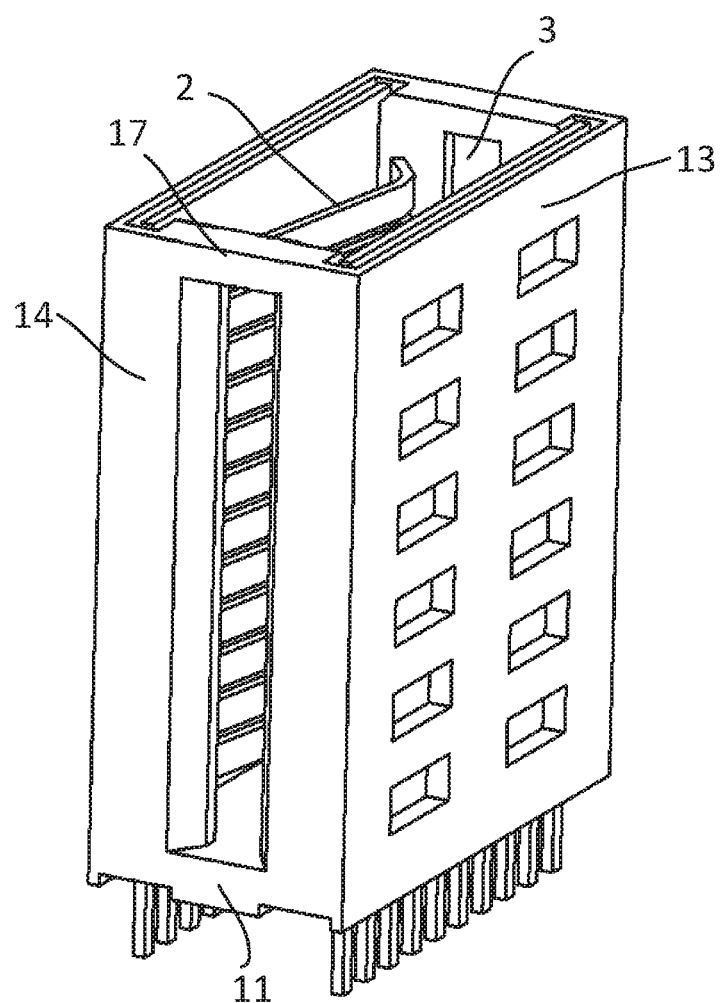
FIG. 8 is a perspective view of an electrical connector according to another embodiment.

In an electrical connector 100 according to another embodiment, as shown in FIG. 8, two connecting portions 17 are provided between ends of the two opposite third sidewalls 14 in the second direction Y away from the bottom wall 11. Each connecting portion 17 is integrally connected to tops of the first sidewall 12 and the second sidewall 13, respectively. In this way, a gap between the mounting portion of the first sidewall 12 and the mounting portion of the second sidewall 13 may be kept constant (that is, the width of the sliding passage in the second direction Y is kept constant) to prevent the gap between the mounting portion of the first sidewall 12 and the mounting portion of the second sidewall 13 from becoming large during use, thereby preventing the terminal body 21 from being separated from the bus bar 200 during drawing the drawer 300 from the cabinet 400. In other embodiments, the number of connecting portions 17 may be one or more than two, and the positions of the connecting portion 17 may also be disposed in the middle of the first sidewall 12 and the second sidewall 13.

Figure 9:
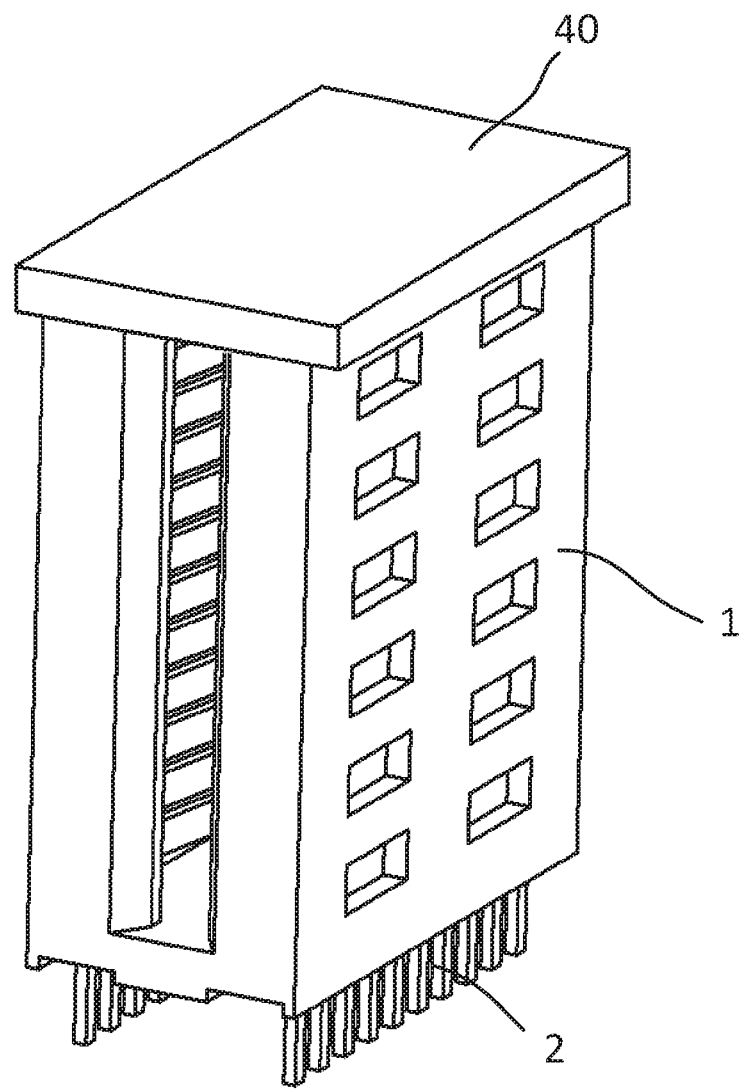
FIG. 9 is a perspective view of the electrical connector according to another embodiment.
Figure 10:
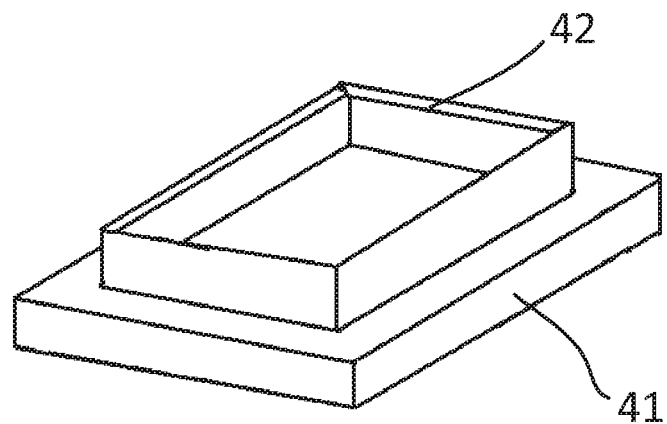
FIG. 10 is a perspective view of a cover of the electrical connector of FIG. 9.

An electrical connector 100 according to another embodiment, as shown in FIG. 9, comprises a cover 4 covering a top of the support bracket 1 to prevent dust or the like from entering the support bracket 1. As shown in FIG. 10, the cover 4 has a cover body 41 configured to cover a top surface of the support bracket 1. The cover 4 has a cylindrical fastening portion 42 integrally connected to the cover body 41 and fastened onto an outside surface of the top of the support bracket 1 for preventing the mounting portions of the first and second sidewalls 12, 13 from becoming large during use, thereby preventing the terminal body 21 from being separated from the bus bar 200 during drawing the drawer 300 from the cabinet 400.

In some embodiments, as shown in FIGS. 4, 5, 8 and 9, the support bracket 1 has at least one heat dissipation hole 18 for dissipating heat generated by the electrical connector 100 and the bus bar 200.

As shown in FIGS. 1-7, 11, and 12, an electrical connector assembly comprises a bus bar 200 and an electrical connector 100. The bus bar 200 is configured to be mounted on the inner sidewall of the cabinet 400 adapted to hold a drawer 300 and extends in the first plane. The electrical connector 100 has a support bracket 1 and two connection terminals 2. Each of the connection terminals 2 has a terminal body 21 and at least one terminal connection portion 22. The terminal body 21 is mounted in the support bracket 1 and is configured to be held in sliding electrical contact with the bus bar 200 extending in the first plane. The terminal connection portion 22 protrudes from a bottom of the terminal body 21 in a first direction X parallel to the first plane so as to be electrically connected to the circuit board 500.

In use, the support bracket 1 is mounted on the mounting sidewall 301 of the drawer 300 adapted to hold the circuit board 500 and held in the cabinet 400. During drawing the drawer 300 from the cabinet 400, the support bracket 1 and the connection terminals 2 mounted in the support bracket 1 may slide relative to the bus bar 200 mounted on the inner sidewall of the cabinet 400 and extending in the first plane, and the connection terminals 2 are always kept in electrical contact with the bus bar 200 to supply power or transmit electrical signals by the bus bar 200 to the circuits disposed in the circuit board 500 within the drawer 300. In this way, it is possible to maintain the supply of electrical power to the electrical component during the operations of service, testing and the like of the electrical components in the drawer 300.

Figure 11:
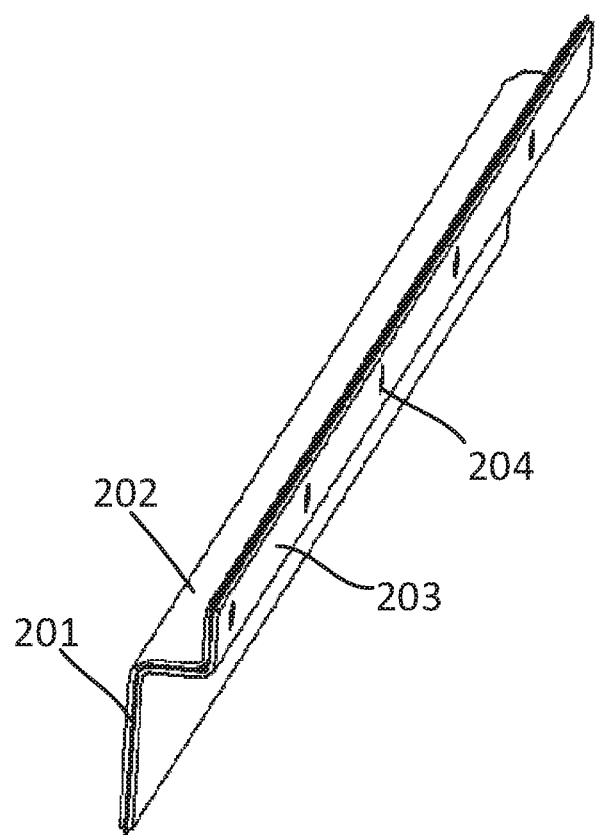
FIG. 11 is a perspective view of a bus bar according to an embodiment.
Figure 12:
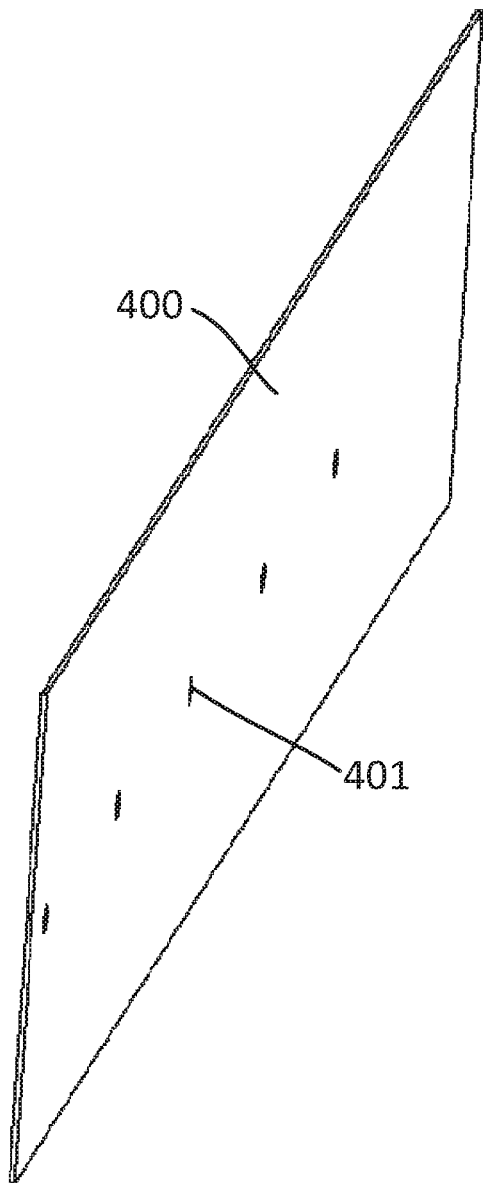
FIG. 12 is a perspective view of a sidewall of a cabinet according to an embodiment.

The bus bar 200, as shown in FIG. 11, has a mounting section 203, a connection portion 202, and a bus bar body 201. A first side of the mounting section 203 is configured to be connected to the inner sidewall of the cabinet 400, for example, by bolts sequentially passing through a mounting hole 204 in the mounting section 203 and a corresponding mounting hole 401 (shown in FIG. 12) in the sidewall of the cabinet 400, or by welding. A first side of the connection portion 202 is integrally connected to a second side of the mounting section 203 and extends away from the inner sidewall of the cabinet 400 such that there is a gap between the bus bar body 201 connected to the second end of the connection portion 202 and the sidewall of the cabinet 400. The bus bar body 201 is integrally connected to the second end of the connection portion 202 and substantially parallel to the inner sidewall of the cabinet 400, and the bus bar body 201 is configured to be inserted into the sliding channel 3 in the first direction X from a upper portion of the support bracket 1 and to be always in electrical contact with the connection terminal 2 while sliding relative to the support bracket 1. In an embodiment, the bus bar 200 may be stamped from a sheet-shaped material.

Figure 13:
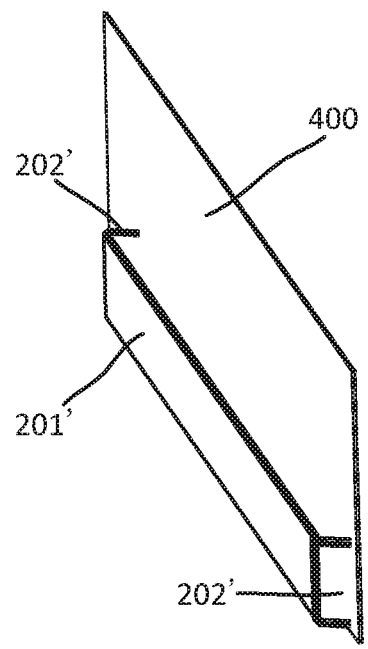
FIG. 13 is a perspective view of a bus bar mounted on a sidewall of a cabinet according to another embodiment.

A bus bar 200 according to another embodiment, as shown in FIG. 13 is mounted on a sidewall of a cabinet 400. The bus bar 200 includes a bus bar body 201' substantially parallel to the inner sidewall of the cabinet 400, connected to the inner sidewall of the cabinet 400, and configured to be inserted into the sliding channel 3 in a third direction Z from a side of the support bracket 1 and to be always in in electrical contact with the connection terminal 2 of the electrical connector 100 when sliding relative to the support bracket 1. The bus bar body 201' includes two mounting portions positioned at two opposite ends of the bus bar body 201' and configured to be connected to the inner sidewall of the cabinet 400, and two connecting portions 202' integrally connected between the bus bar body 201' and the corresponding mounting portions. The bus bar 200 may be stamped from a sheet of material.

In a case in which the connection portion 17, shown in FIG. 8, is provided or the cover 4, shown in FIG. 9, is provided, the bus bar 200 shown in FIG. 13 is used. When the bus bar 200 is used, the body 201 of the bus bar 200 firstly penetrates through the sliding channel 3 of the support bracket 1, and then the bus bar 200 is fixed on the inner sidewall of the cabinet 400. In other embodiments, the bus bar 200 shown in FIG. 13 may also be adapted to the case where the connection portions 17 or the cover 4 is not provided.

As shown in FIGS. 1-3, an electrical equipment comprises an electrical connector assembly as described above, a cabinet 400, and at least one drawer 300. An inner sidewall of the cabinet 400 is substantially parallel to the first plane, the bus bar 200 of the electrical connector assembly is mounted on the inner sidewall of the cabinet 400, the drawer 300 is reciprocally movably held in the cabinet 400 and is adapted to hold a circuit board 500, and the electrical connector 100 of the electrical connector assembly is positioned on a mounting sidewall 301 of the drawer 300 facing the inner sidewall of the cabinet 400 on which the bus bar 200 is mounted.

Figure 14:
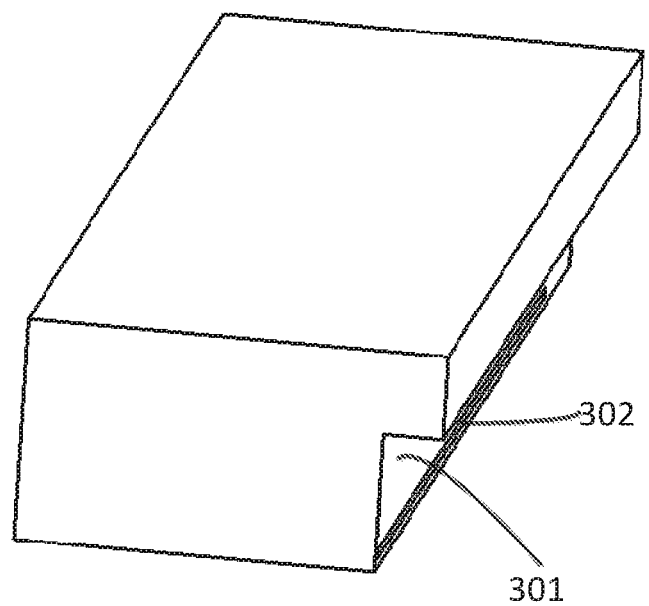
FIG. 14 is a perspective view of a drawer of an electrical equipment according to an embodiment.

In an embodiment, as shown in FIG. 14, a lower portion of the mounting sidewall 301 of the drawer 300 is provided with an avoidance space for the electrical connector assembly, and a through hole 302 is provided in the mounting sidewall 301. The circuit board 500, shown in FIG. 15, substantially perpendicular to the first plane partially protrudes from the through hole 302 and is electrically connected to the terminal connection portion 22 of the connection terminal 2 of the electrical connector 100.

What is claimed is:

1. An electrical connector, comprising:
a support bracket, including:
   a bottom wall;
   a first sidewall extending upward from the bottom wall in a direction perpendicular to the bottom wall and having a first mounting portion; and
   a second sidewall extending upward from the bottom wall in the direction perpendicular to the bottom wall and having a second mounting portion; and
a first connection terminal and a second connection terminal each including a terminal body mounted on the support bracket and in sliding electrical contact with a bus bar extending in a first plane, a terminal body of the first terminal mounted on the first mounting portion on a first side of the first sidewall, and a terminal body of the second terminal mounted on the second mounting portion on a first side of the second sidewall, the first mounting portion of the first sidewall and the second mounting portion of the second sidewall are disposed face to face, each of the first and second connection terminals further including a terminal connection portion protruding through the bottom wall of the terminal body in a first direction parallel to the first plane for electrically connecting to a circuit board.

2. The electrical connector of claim 1, wherein the support bracket includes two pairs of third sidewalls, a first of the two pairs of third sidewalls extending from opposite sides of the first sidewall in a second direction perpendicular to the first plane, a second of the two pairs of third sidewalls extending from opposite sides of the second sidewall in the second direction, one of the two pairs of third sidewalls is opposite to the other of the two pairs of third sidewalls to form a sliding channel between the first mounting portion of the first sidewall and the second mounting portion of the second sidewall, a portion of the bus bar slides through the sliding channel in a third direction perpendicular to both the first direction and the second direction.

3. The electrical connector of claim 2, wherein the terminal body has a base extending in a plane parallel to the first plane and mounted at the first mounting portion, the terminal connecting portion extending from the base, and a contact portion bent from a side of the base to a surface of the base, the contact portion in electrical contact with the bus bar.

4. The electrical connector of claim 3, the contact portion of the connection terminal resiliently abuts a first side of the bus bar and a contact portion of the another connection terminal resiliently abuts a second side of the bus bar opposite the first side.

5. The electrical connector of claim 4, wherein the contact portion has a plurality of elastic pieces spaced apart from each other, each of the elastic pieces has an arc-shaped structure protruding toward the bus bar and in sliding contact with the bus bar.

6. The electrical connector of claim 4, wherein each of the pairs of third sidewalls has an engaging groove, a pair of opposite sides of the base of each of the connection terminals are at least partially inserted into the engaging groove.

7. The electrical connector of claim 2, wherein a connecting portion is disposed between ends of two opposite third sidewalls in the second direction and distal from the bottom wall.

8. An electrical equipment, comprising:
a cabinet having an inner sidewall substantially parallel to a first plane;
a bus bar configured to be mounted on the inner sidewall of the cabinet and extending in the first plane;
an electrical connector including a support bracket having a bottom wall and a sidewall extending upward from the bottom wall in a direction perpendicular to the bottom wall and parallel to the first plane, and a connection terminal, the connection terminal having a terminal body mounted on the sidewall of the support bracket and in sliding electrical contact with the bus bar, and a terminal connection portion protruding through the bottom wall of the terminal body in a first direction parallel to the first plane for electrically connecting to a circuit board; and
a drawer reciprocally held in the cabinet and adapted to hold the circuit board, the electrical connector is positioned on a mounting sidewall of the drawer facing the inner sidewall of the cabinet on which the bus bar is mounted.

9. The electrical equipment of claim 8, wherein a lower portion of the mounting sidewall of the drawer has an avoidance space adapted to mount the bus bar and the electrical connector, the mounting sidewall has a through hole, the circuit board perpendicular to the first plane partially protrudes from the through hole and is electrically connected to the terminal connection portion.

10. An electrical connector assembly, comprising:
a bus bar configured to be mounted on an inner sidewall of a cabinet and extending in a first plane; and
an electrical connector including a support bracket having a first sidewall and a second sidewall opposing the first sidewall and defining a sliding channel therebetween for receiving the bus bar, the first sidewall and the second sidewall have a heat dissipation hole positioned therethrough, and a first connection terminal and a second connection terminal, the first and second connection terminals each having a terminal body mounted on a respective one of the first and second sidewalls of the support bracket and in sliding electrical contact with a respective side of the bus bar, the support bracket includes a bottom wall, the terminal connecting portion protruding through the bottom wall in the first direction, the first sidewall extending upward from the bottom wall in a direction perpendicular to the bottom wall, the first sidewall having a mounting portion mounting the terminal body of the first connection terminal on a first side of the first sidewall, and the second sidewall extending upward from the bottom wall in the direction perpendicular to the bottom wall, the second sidewall having a mounting portion mounting the terminal body of the second connection terminal on a first side of the second sidewall, the mounting portion of the first sidewall and the mounting portion of the second sidewall are disposed face to face, the sliding channel extending along the first and second sidewalls and between the first connection terminal and the second connection terminal and a terminal connection portion protruding from a bottom of each terminal body in a first direction parallel to the first plane for electrically connecting to a circuit board, the support bracket includes two pairs of third sidewalls, a first of the two pairs of third sidewalls extending from opposite sides of the first sidewall in a second direction perpendicular to the first plane, a second of the two pairs of third sidewalls extending from opposite sides of the second sidewall in the second direction, one of the two pairs of third sidewalls is opposite to the other of the two pairs of third sidewalls to form the sliding channel between the mounting portion of the first sidewall and the mounting portion of the second sidewall, a portion of the bus bar slides through the sliding channel in a third direction perpendicular to both the first direction and the second direction.

11. The electrical connector assembly of claim 10, wherein the terminal body has a base extending in a plane parallel to the first plane and mounted at the mounting portion, the terminal connecting portion extending from the base, and a contact portion bent from a side of the base to a surface of the base, the contact portion in electrical contact with the bus bar.

12. The electrical connector assembly of claim 11, wherein the contact portion of the connection terminal resiliently abuts a first side of the bus bar and a contact portion of the another connection terminal resiliently abuts a second side of the bus bar opposite the first side.

13. The electrical connector assembly of claim 12, wherein the contact portion has a plurality of elastic pieces spaced apart from each other, each of the elastic pieces has an arc-shaped structure protruding toward the bus bar and in sliding contact with the bus bar.

14. The electrical connector assembly of claim 12, wherein the bus bar includes:
  a mounting section having a first side connected to the inner sidewall of the cabinet;
  a connecting portion having a first end integrally connected to a second side of the mounting section and extending away from the inner sidewall of the cabinet; and
  a bus bar body integrally connected to a second end of the connecting portion and parallel to the inner sidewall of the cabinet, the bus bar body inserted into the sliding channel in the first direction from an upper portion of the support bracket and in electrical contact with the connection terminal while sliding relative to the support bracket.

15. The electrical connector assembly of claim 12, wherein the bus bar includes:
  a bus bar body connected to and substantially parallel to the inner sidewall of the cabinet, the bus bar body inserted into the sliding channel in a third direction from a side of the support bracket and in electrical contact with the connection terminal while sliding relative to the support bracket;
  a pair of mounting sections positioned at opposite ends of the bus bar body and connected to the inner sidewall of the cabinet; and
  a pair of connecting portions through which the mounting sections are integrally connected to the bus bar body.

* * * * *